(12) United States Patent
Nalbant

(10) Patent No.: US 7,199,643 B2
(45) Date of Patent: Apr. 3, 2007

(54) HOT SWAPPABLE PULSE WIDTH MODULATION POWER SUPPLY CIRCUITS

(75) Inventor: Mehmet K. Nalbant, Cupertino, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 10/672,437

(22) Filed: Sep. 26, 2003

(65) Prior Publication Data
US 2005/0068085 A1 Mar. 31, 2005

(51) Int. Cl.
G05F 1/10 (2006.01)

(52) U.S. Cl. .............. 327/538; 327/104; 327/172; 327/110; 363/21.1; 363/21.11; 363/21.18

(58) Field of Classification Search .......... 327/104; 363/89, 65, 21.1, 21.06
See application file for complete search history.

(56) References Cited

U.S. PATENT DOCUMENTS

| | | | | |
|---|---|---|---|---|
| 4,870,555 | A | 9/1989 | White | 363/21 |
| 4,953,068 | A | 8/1990 | Henze | 363/17 |
| 5,282,123 | A * | 1/1994 | Boylan et al. | 363/21.1 |
| 5,519,599 | A | 5/1996 | Shinada et al. | 363/21 |
| 5,631,810 | A | 5/1997 | Takano | 363/21 |
| 5,726,869 | A | 3/1998 | Yamashita et al. | 363/21 |
| 5,734,563 | A | 3/1998 | Shinada | 363/21 |
| 5,907,481 | A | 5/1999 | Svardsjo | 363/25 |
| 5,956,245 | A * | 9/1999 | Rozman | 363/89 |
| 5,999,420 | A | 12/1999 | Aonuma et al. | 363/21 |
| 6,014,322 | A * | 1/2000 | Higashi et al. | 363/65 |
| 6,038,154 | A * | 3/2000 | Boylan et al. | 363/127 |
| 6,072,701 | A | 6/2000 | Sato et al. | 363/17 |
| 6,078,509 | A | 6/2000 | Jacobs et al. | 363/21 |
| 6,101,104 | A | 8/2000 | Eng | 363/21 |
| 6,111,769 | A | 8/2000 | Zhang et al. | 363/127 |
| 6,115,276 | A | 9/2000 | Mao | 363/127 |
| 6,297,970 | B2 * | 10/2001 | Hemena et al. | 363/21.06 |
| 6,456,510 | B1 * | 9/2002 | Patel et al. | 363/21.06 |
| 6,574,124 | B2 * | 6/2003 | Lin et al. | 363/65 |

FOREIGN PATENT DOCUMENTS

| | | |
|---|---|---|
| JP | H08-018419 A | 1/1996 |
| JP | H08-037777 A | 2/1996 |
| JP | H08-168239 A | 6/1996 |
| JP | H09-285116 A | 10/1997 |
| JP | H11-235029 A | 8/1999 |

* cited by examiner

Primary Examiner—Tuan T. Lam
Assistant Examiner—Hiep Nguyen
(74) Attorney, Agent, or Firm—Blakely Sokoloff Taylor & Zafman LLP

(57) ABSTRACT

Hot swappable pulse width modulation power supply circuits preferably realized in integrated circuit form. The hot swap circuits provide for de-bouncing, controlled charging of the input capacitor of the power supply circuit and soft-start of the pulse width modulator after charging the input capacitor. Other features include a low voltage lock-out, and an output for coupling to a synchronous rectifier driver to synchronize synchronous rectifiers on the secondary side of a coupling transformer in isolated systems. The hot swap capability may be disabled through an enable pin, or not implemented by not connecting the integrated circuit in a manner to use the hot swap capability.

24 Claims, 5 Drawing Sheets

HOT SWAPPABLE PULSE WIDTH MODULATION POWER SUPPLY CIRCUITS

BACKGROUND OF THE INVENTION

1. Field of the Invention

The present invention relates to the field of switching power supplies.

2. Prior Art

Many power supplies need to be hot pluggable into a live input supply such as a live backplane in customary telecommunications equipment so that boards having the power supply thereon may be swapped out without shutting down the equipment. In such applications, the transient current drain on the main power supply when plugging in the new board must be limited to avoid causing a transient voltage on the backplane that will interfere with the continuous and error free operation of other circuits powered from the same backplane.

DETAILED DESCRIPTION OF THE PREFERRED EMBODIMENT

The present invention integrates the hot plug function, commonly called a "hot swap" function, into the control of pulse width modulation (PWM) integrated circuits, resulting in reduced system cost and board space for the power supply. The invention may be applied to different PWM architectures, though in the embodiment disclosed here, for purposes of illustration and clarity in the description and not by way of limitation, the invention will be described with respect to two transistor forward or flyback topologies. The specific embodiment disclosed is for a negative hot swappable version intended for use with a −48 volt power source.

Figure 1:
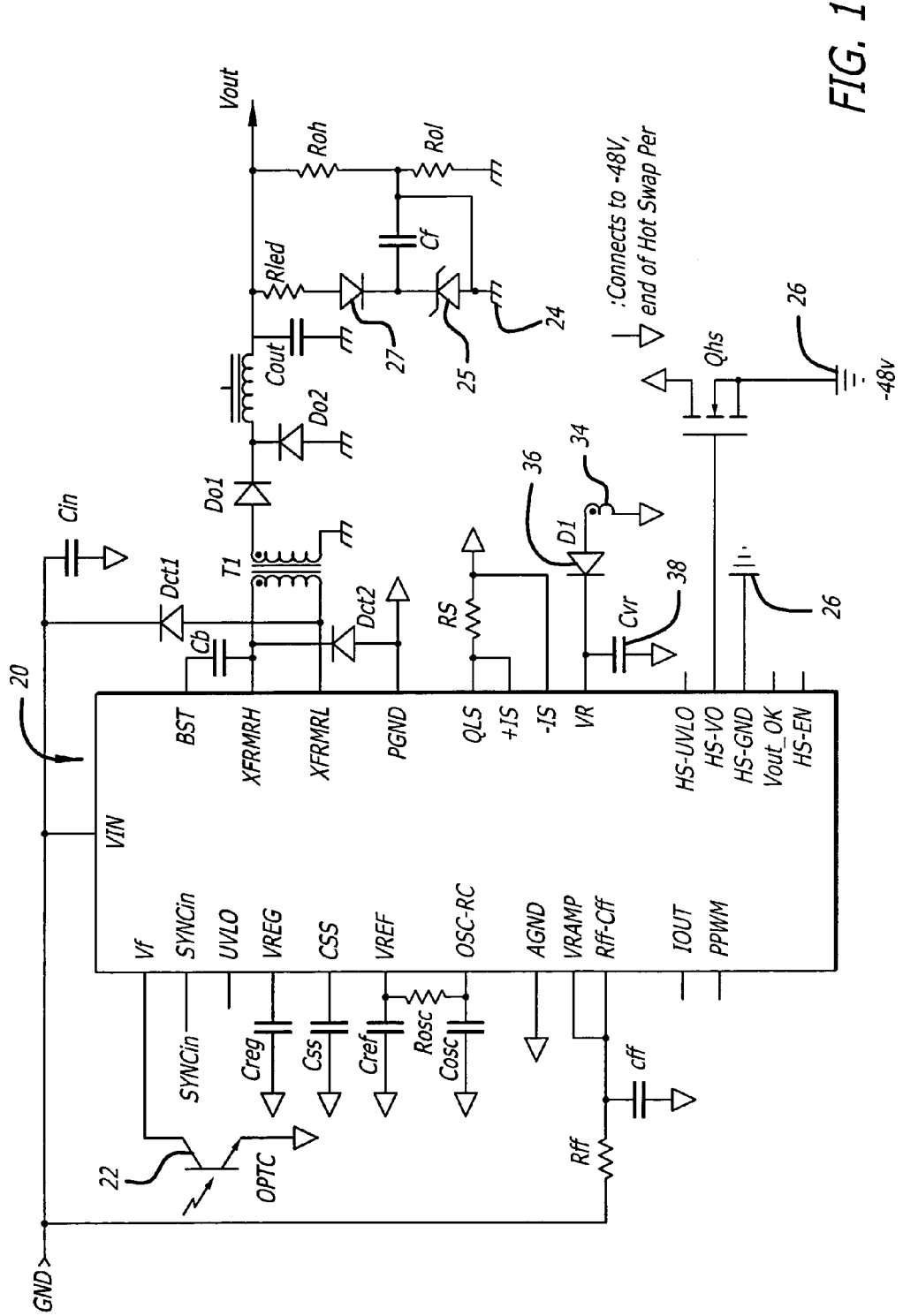
FIG. 1 is a diagram showing the application of one integrated circuit form of the present invention to a negative voltage system.

Now referring to FIG. 1, a diagram showing the application of one integrated circuit form of the present invention to a negative voltage system, specifically in the exemplary embodiment a −48 volt system, may be seen. An integrated circuit generally indicated by the numeral 20 is coupled to an external transformer to provide isolation between the primary and a secondary side of the transformer. The external circuitry connected to the transformer T1 includes diodes Do1 and Do2, inductor L1 and output capacitor Cout connected in the usual forward configuration. Resistors Rled, the light emitting diode 27 (part of the optocoupler OPTO), the SCR 25, the resistors Roh and Rol and capacitor Cf provide an electrically isolated feedback of the output voltage to the integrated circuit, and thus isolation between the supply providing power to the integrated circuit 20 and the output voltage Vout and its associated ground.

The circuit shown in FIG. 1 has three common connections. The first, labeled GND, is the highside of the system power supply, generally at system ground for a negative backplane system. The second, indicated by the symbol identified by the numeral 24, is the ground of the DC output Vout, which in the exemplary embodiment is isolated from the power supply highside or ground GND, and may be as much as 1500 volts different from that ground. The third common connection, indicated by the symbol identified by the numeral 26 is the negative supply connection, actually the minus or lowside power supply connection in the exemplary embodiment, namely −48 volts. Note that not only is the source of external (or internal) transistor Qhs connected to that common connection, but also connected to that connection is the integrated circuit pin HS-GND. Another common connection to the integrated circuit 20 is indicated by the open arrow symbols, which are all connected in common to the drain of transistor Qhs. Thus, when transistor Qhs is turned on hard, all connections to the drain of transistor Qhs are in fact connected to the −48 volt supply in the exemplary embodiment, with only a small voltage drop across transistor Qhs. In that regard, the use the transistor Qhs in the exemplary embodiment and the coupling of various common connections to the drain of transistor Qhs is a feature of the integrated circuit 20 and its external circuitry shown in FIG. 1 providing the hot swap capability. If the hot swap capability of the circuit is not to be used, the common connection provided to the drain of transistor Qhs in FIG. 1 can instead be connected directly to the low power supply terminal 26. Similarly, for positive power supply applications, the common connection labeled GND may be connected to the positive power supply terminal and terminal 26 connected to the associated power supply ground. Again, use of transistor Qhs or its equivalent will provide hot swap capability, whereas the connecting of the common connection normally coupled to the drain of transistor Qhs directly to terminal 26 will eliminate the hot swap feature.

Figure 2:
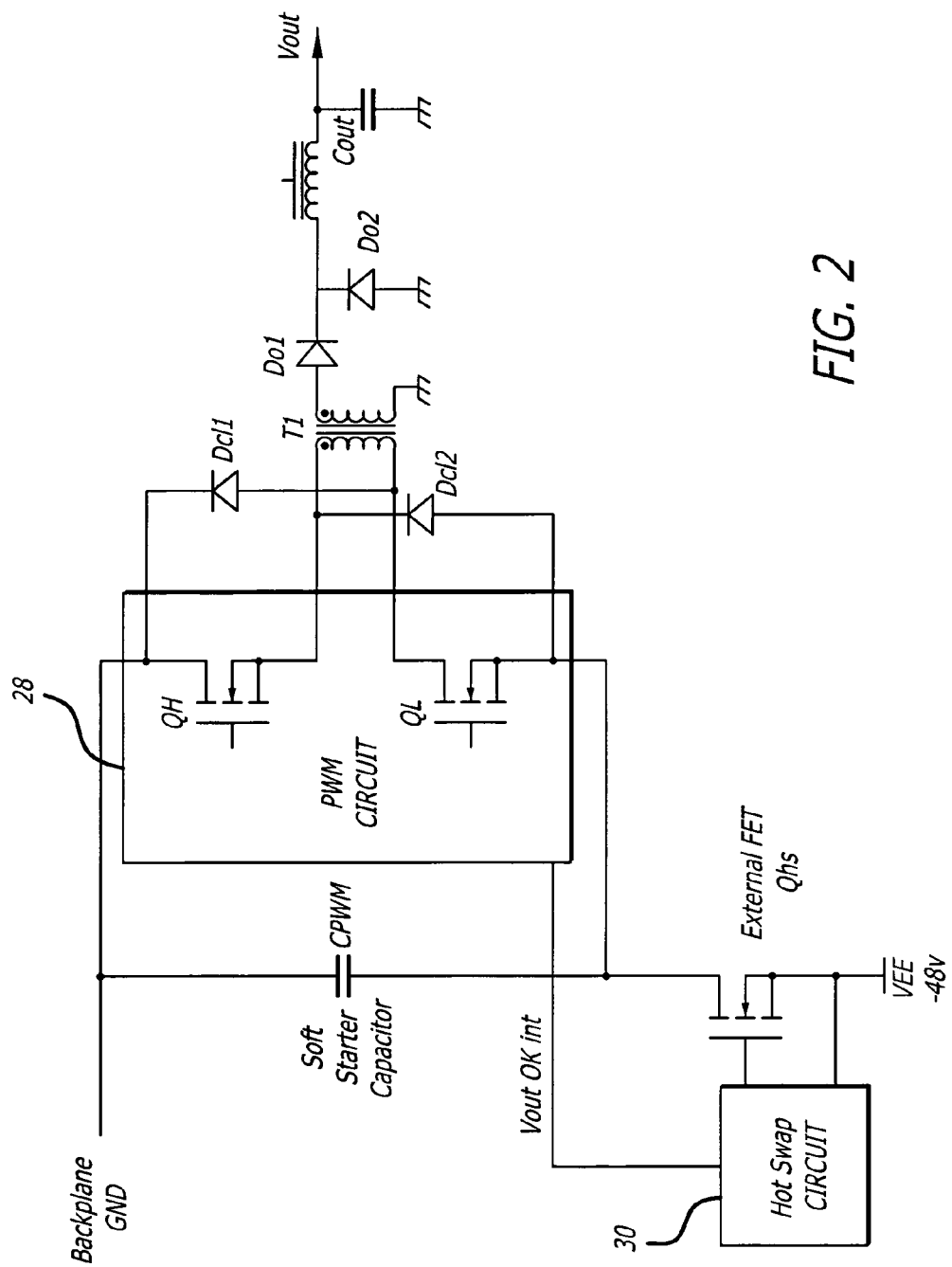
FIG. 2 is a conceptual block diagram of one embodiment of the present invention.

Now referring to FIG. 2, a conceptual block diagram of the present invention may be seen. This diagram shows two principal circuits, other than the output circuitry, namely a pulse width modulation (PWM) circuit 28 and a hot swap circuit 30. The hot swap circuit 30 controls transistor Qhs which, when turned on in the exemplary embodiment, will connect the PWM circuit between the backplane ground GND and the −48 volt power supply voltage. A soft-start capacitor CPWM is coupled in parallel across the PWM circuit to slow the change in voltage across the PWM circuit. Upon power application, capacitor CPWM is completely discharged and transistor Qhs is turned off. In the exemplary embodiment, if the voltage applied to the integrated circuit is higher than a default voltage threshold of the hot swap controller, in the exemplary embodiment 30 volts, and the voltage is applied for more than 50 milliseconds as determined by an internally generated turn-on delay, then the gate to source voltage of Qhs is gradually increased to provide a controlled slew-rate turn-on. Under these conditions in the exemplary embodiment, the drain voltage of transistor Qhs falls at a rate of approximately 6 volts per millisecond. As long as the drain voltage of transistor Qhs with respect to its source is greater than 2.4 volts, the signal Vout-OK_int is held low, disabling the start of the PWM circuit. When finally this voltage falls below 2.4 volts in the exemplary embodiment and the voltage across capacitor CPWM reaches the default start-up voltage of the PWM circuit (30 volts in the exemplary embodiment), then the PWM circuit is enabled and a PWM soft-start cycle is initiated. This cycle has two purposes. One, initially the width of the power pulse applied to the transformer is very narrow, helping to finish the charging of the CPWM capacitor. This also helps the internal transistor Qb (to be described) to charge the boost capacitor Cb (see FIG. 1). As the voltage across the soft-start capacitor CSS (see FIG. 1 again) increases, so do the width of the pulses applied to the transformer until the output voltage Vout is in regulation.

Figure 3A:
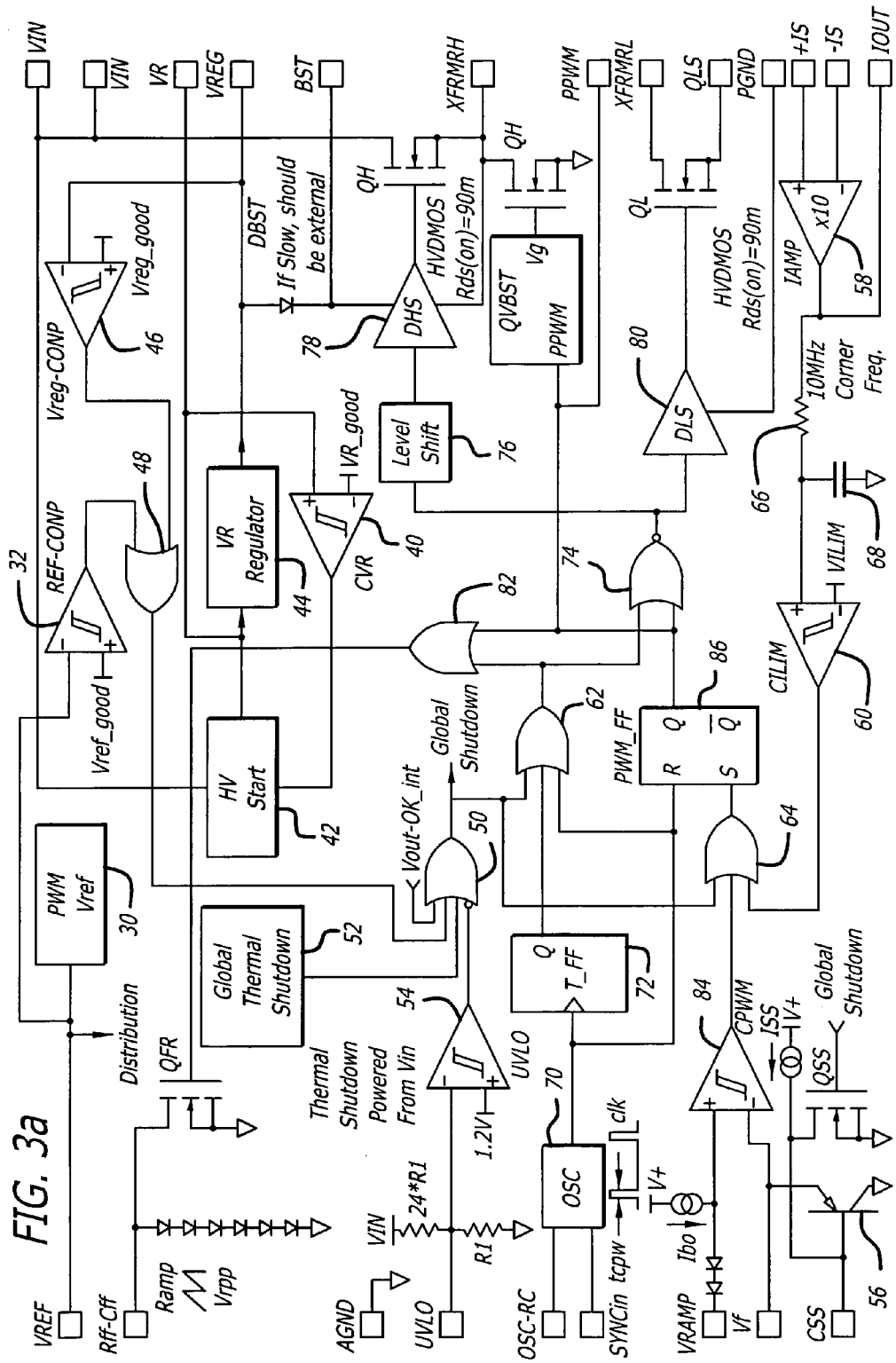
FIG. 3a is a block diagram of the PWM circuit of the exemplary embodiment of the present invention.
Figure 3B:
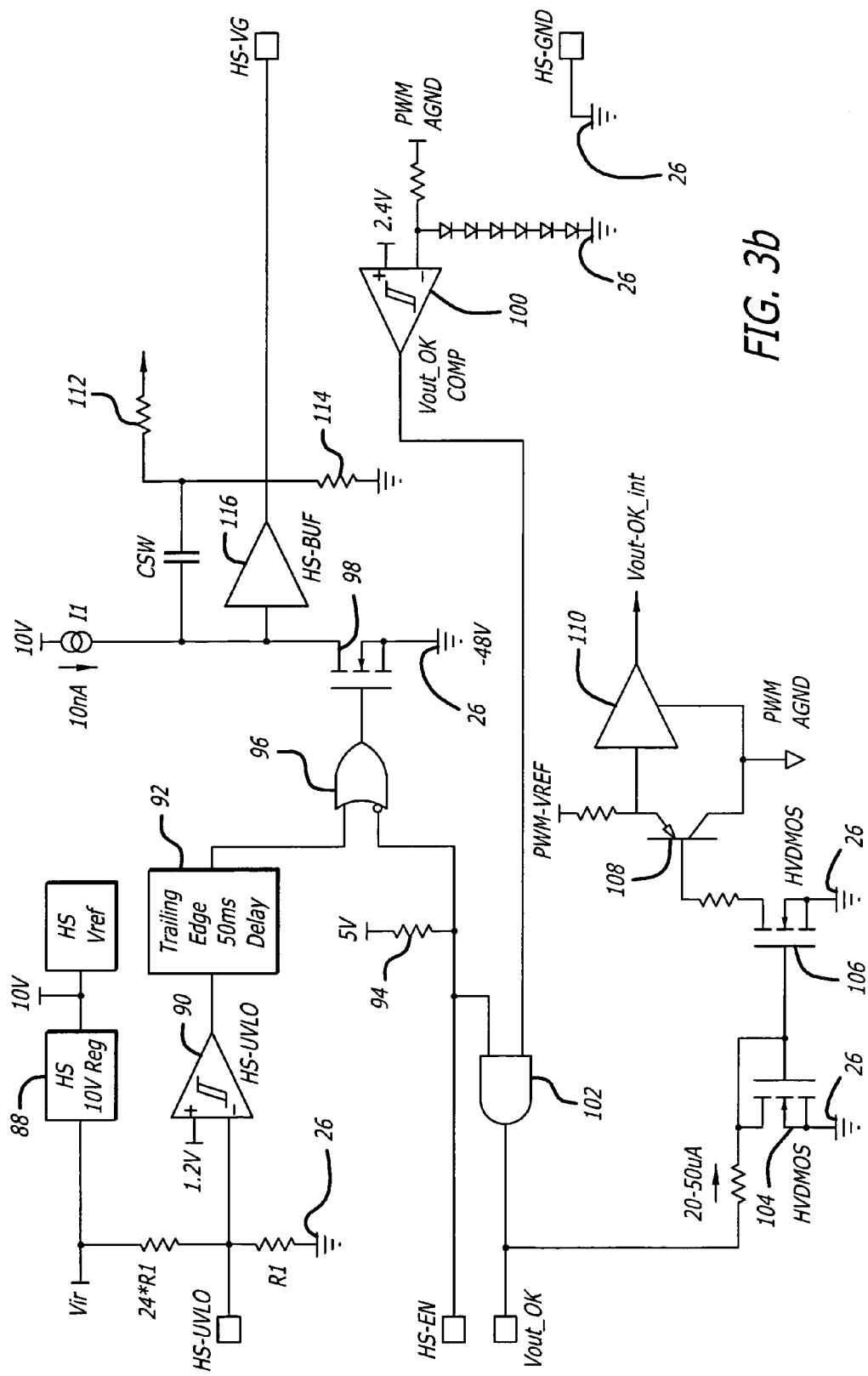
FIG. 3b is a block diagram of the hot swap controller circuit of the exemplary embodiment of the present invention.

FIG. 3a is a block diagram of the PWM circuit of the exemplary embodiment of the present invention, and FIG. 3b is a block diagram of the hot swap controller circuit of the exemplary embodiment of the present invention. Because of the interrelationship of these two diagrams, the two will be described together, frequently with respect to further reference to FIGS. 1 and 2. In the negative supply configuration shown in FIG. 1, the input terminal Vin (FIG. 3a) is connected to the system ground (GND) shown in FIG. 1. The common negative connections for the PWM circuit (FIG. 3a) all connect to the PWM circuit ground terminal AGND, which as may be seen in FIG. 1, is in turn connected to the drain of n-channel device Qhs. In the soft-start circuit of FIG. 3b, the common ground connections are coupled to the terminal HS-GND, which is terminal 26 of FIG. 1, the –48 volt negative power supply terminal. Also, it will be noted from FIG. 1 that the input capacitor Cin is coupled between the Vin (GND) terminal and the drain of transistor Qhs. While a current sense resistor RS is coupled between the QLS terminal and the drain of transistor Qhs, it is a low valued resistor. Thus the capacitor Cin effectively serves as the soft-start capacitor CPWM of FIG. 2.

The timing for the PWM circuit of FIG. 3a is determined by the oscillator 70, having a frequency determined by the resistor ROSC, coupled between the OSC-RC terminal and the $V_{ref}$ terminal and the capacitor COSC, coupled between the OSC-RC terminal and PWM circuit ground (the AGND terminal), or by an external frequency provided to the SYNCin terminal. In general, oscillator 70 operates at twice the switching frequency of the PWM circuit, being divided in half by flip-flop 72. The output of flip-flop 72, which is high 50% of the time, will drive the output of OR gate 62 high 50% of the time, driving the output of NOR gate 74 low half the time to turn off both the highside n-channel transistor QH through level shift circuit 76 and the highside DMOS transistor driver 78, and the lowside n-channel transistor QL through the DMOS lowside driver 80. Note that the transistors QH and QL may be on the integrated circuit, or external devices, as desired.

To illustrate the inter-cooperation of the PWM circuit of FIG. 3a and the soft-start circuit of FIG. 3b, it is perhaps best to first describe the operation of the FIG. 3a after all soft-start sequences have been completed. In this case, Vin is connected to the highside power supply connection GND (FIG. 1) and the PWM circuit ground AGND is connected through a low resistance (the on resistance of transistor Qhs of FIG. 1) to the –48 volt supply.

In normal operation of the exemplary embodiment, the PWM voltage reference generator 30 will provide a reference voltage Vref which is above a fixed reference VRef_good, thus providing a low output from comparator 32. The input terminal VR is a DC voltage input corresponding to the voltage across transformer winding 34 as half wave-rectified by diode 36 and filtered by capacitor 38 (FIG. 1). In normal operation, this voltage will be above the internally generated reference voltage VR_good, so that the output of comparator 40 will be high. Thus, the high voltage start circuit 42 will allow the internal voltage regulator 44 to generate a 10 volt reference for internal use in the circuit. This reference, being above a fixed voltage VReg_good, results in a low output of comparator 46, so that both inputs to OR gate 48 are low, thus providing a low output of OR gate 48 to one of the inputs of OR gate 50.

As shall subsequently be seen, in normal operation the signal Vout-OK_int will be low. Similarly, unless the integrated circuit is encountering an over temperature condition, the output of the global thermal shutdown circuitry will be low. Also, since Vin (GND of FIG. 1) will be more than 30 volts above the circuit ground (the drain of transistor Qhs of FIG. 1), the negative input to the comparator 54 will be higher than the positive input of 1.2 volts above circuit ground, and accordingly, the corresponding input to OR gate 50 will be low, resulting in the Global Shutdown signal of OR gate 50 being low. The low Global Shutdown signal will hold n-channel transistor Qhs off so that the current source ISS will charge the capacitor Css (see FIG. 1) connected to terminal CSS, holding transistor 56 off. Consequently, the voltage on terminal Vf, as determined by conduction through phototransistor 22 (see FIG. 1), will depend upon the conduction of the phototransistor which, in turn, will depend upon the current through the light emitting diode Rled.

Also during normal operation, the current through the transformer T1 and thus through transistors QH and QL never exceeds a safe limit. Thus the voltage across resistor RS (see FIG. 1) as provided to the input pins +IS and –IS when amplified by amplifier 58 will not exceed the fixed voltage VILIM, so that the output of comparator 60 will be low. Thus, with the global shutdown signal low, one input to OR gate 62 will be low, and with the current limit not exceeded, two inputs to OR gate 64 will be low. Resistor 66 and capacitor 68 have a high frequency roll-off to limit the noise on the positive input to comparator 60, though do not generally interfere with the sensing of peak currents within each cycle of the PWM circuit, typically operating with a frequency on the order of 250 KHz.

In normal operation, the output of flip-flop 72 will be high half of the time, holding the gate of transistors QFR high at least half of the time through OR gates 62 and 82. Whenever the gate of transistor QFR is low, the combination of resistor Rff and capacitor Cff (see FIG. 1) will generate a ramp which is connected to the VRAMP which is compared with the feedback voltage Vf by comparator 84. When the ramp voltage exceeds the feedback voltage, the output of OR gate 64 will go high, setting RS flip-flop 86 to drive the Q output of flip-flop 86 high, and thus the output of NOR gate 74 low, to turn off highside and lowside switches (switching transistors) QH and QL. Thus, the highside and lowside switches are off at least 50% per of the time, and such additional time as required to maintain the desired output voltage, as characteristic of pulse width modulated switching regulators. Also, the current through the sense resistor RS connected to the drain of transistor Qhs is sensed by amplifier 58 to provide a voltage IOUT proportional to the current. Also, if the current ever exceeds a predetermined limit, then the output of comparator will go high, setting RS flip-flop 86 through OR gate 64 to drive the Q output of flip-flop 86 high, and thus the output of NOR gate 74 low, to turn off the highside and lowside switches QH and QL for the rest of that clock cycle. Thus the circuit limits the rate of increase of voltage on the input to the pulse width modulator or other power integrated circuit powered by the soft start circuitry, or the maximum current provided to that integrated circuit, whichever reaches its predetermined limit first. In the circuit shown in FIG. 3a, current Ib0 aids in the generation of the ramp, with resistor Rff providing feed forward of the input voltage to the regulator for immediate reduction in the pulse width upon increase of the input voltage, and vice versa. Also, the switching of the highside switch QH and the resulting voltage variation in the highside transformer terminal XFRMRH, together with the diode DBST, charge the boost capacitor Cb (see FIG. 1) to provide increased gate drive for the highside transistor. Also during normal operation, the Global Shutdown signal is low, holding transistor QSS off and allowing the current source ISS to maintain a charge on capacitor Css (FIG. 1).

An exemplary embodiment of the soft-start circuitry operable with the exemplary pulse width modulated switching regulator of FIG. 3a may be seen in FIG. 3b. When the power supply is first plugged into an active system, capacitor Cin (FIG. 1) will be discharged, as will capacitor CSW in the circuit of FIG. 3b. The ground connection 26 of the circuit of FIG. 3b will be immediately pulled to the negative power supply voltage, though the ground AGND of the pulse width modulator circuit of FIG. 3a will temporarily remain at the highside power supply voltage GND (see FIG. 1). Since the pulse width modulator circuit ground AGND is at a much higher voltage than the power supply ground 26, the output of comparator 100 will be low, the output of AND gate 102 (Vout_OK) will be low, transistor 104 will not mirror current to transistor 106, so transistor 108 will be off and the output of buffer 110 Vout-OK_int will be high. This forces a Global Shutdown signal in the circuit of FIG. 3a, turning on transistor QSS to hold the voltage across capacitor CSS at zero. The high Global Shutdown signal causes a high output of OR gate 62 and a high output of OR gate 82 to turn on transistor QFR to shutdown the ramp signal, and to cause a low output of NOR gate 74 to hold the highside and lowside switches QH and QL off.

Referring now specifically to FIG. 3b, the input voltage Vin will provide power to a hot swap voltage regulator 88 which provides a reference voltage for other circuitry in FIG. 3b. Provided the input voltage Vin is over the under voltage lockout voltage limit, the output of comparator 90 will go low, triggering the trailing edge delay circuit 92 to provide a low output after a delay period, in the exemplary embodiment 50 milliseconds, provided the input voltage has remained above the under voltage lockout threshold for that delay period. This turns off transistor 98, provided the hot swap enable signal HS-EN has not been driven low (note pull-up resistor 94). However prior to the turnoff of transistor 98, capacitor CSW will be charged to a voltage determined by the resistor divider of resistors 112 and 114, the pulse width modulator ground AGND being substantially at the highside voltage of the input voltage (GND of FIG. 1). When transistor 98 does turn off, current source I1 begins to provide current to the capacitor CSW, raising the input to buffer 116 and thus the voltage on terminal HS-VG and the gate of transistor Qhs (FIGS. 1 and 2) from the lowside voltage of the power supply. This causes the voltage on the pulse width modulator ground AGND to start decreasing, lowering the voltage at the junction between the resistors 112 and 114 in opposition to the rising voltage at the input to buffer 116. Assuming as an approximation, a fixed threshold for transistor Qhs (FIGS. 1 and 2), the rate of change of the pulse width modulator circuit ground voltage AGND will be approximately:

$$\frac{dV_{AGND}}{dt} = -\frac{I_1}{C_{SW}}\left(\frac{R_{112}+R_{114}}{R_{114}}\right)$$

where: $V_{AGND}$=the pulse width modulation circuit ground voltage
$I_1$=the current of the current source I1
$C_{SW}$=the capacitance of capacitor CSW
$R_{112}$=the resistance of resistor 112
$R_{114}$=the resistance of resistor 114.

Thus the pulse width modulator ground voltage AGND decreases at a substantially constant rate determined by the various parameters involved, until eventually transistor Qhs is turned on hard. When the pulse width modulator ground voltage AGND sufficiently approaches the lowside power supply voltage (within 2.4 volts in the exemplary embodiment), the output of comparator 100 will go high, causing the output of AND gate 102 to go high, mirroring current from transistor 104 to transistor 106 to turn on transistor 108 to drive the output of buffer 110 (Vout-OK_int) low to allow the Global Shutdown signal (FIG. 3a) to go low. This turns off transistor QSS, allowing current source ISS to charge capacitor CSS (FIG. 1) at a predetermined rate to allow the emitter voltage of transistor 56 to rise at that rate, providing for the soft-starting of the pulse width modulator until the feedback voltage Vf takes over when the converter output voltage Vout reaches regulation.

In the embodiment shown, the under voltage lockout for the hot swap circuit of FIG. 3b (HS-UVLO pin) is active for input voltages of less than 30 volts to hold the gate voltage of transistor Qhs low, the 30 volts when divided down by the resistor network equaling the 1.2 volts applied to comparator 90. The under voltage lockout for the pulse width modulator circuit of FIG. 3a (UVLO pin) is active to hold the pulse width modulator circuit in global shutdown until the input voltage Vin minus the drain voltage of transistor Qhs (FIGS. 1 and 2) reaches 30 volts, the 30 volts when divided down by the resistor network equaling the 1.2 volts applied to comparator 54.

Thus, when the hot swap capability of the circuit is enabled and the power supply voltage has exceeded the under voltage lockout threshold for at least the predetermined time period, the output of the delay circuit will go low, pulling the output of OR gate 96 low to turn off transistor 98. This allows the gate voltage on pin HS-VG to rise at a controlled rate from the lowside voltage of the power supply to provide a controlled current through transistor Qhs (FIGS. 1 and 2) to charge the power supply input capacitor Cin with a controlled current dependent on the value of the capacitor. In an exemplary embodiment, the hot swap converter provides a current load from the backplane of approximately 600 milliamps for each 100 µf of input capacitance (capacitor Cin in FIG. 1 and the soft-start capacitor CPWM of FIG. 2). Once the voltage on the lowside of the integrated circuit approaches the lowside voltage of the power supply and there is no global shutdown of the pulse width modulator, the pulse width modulator is started through the soft-start sequence, increasing the pulse width of the pulse width modulator until the output voltage Vout (FIGS. 1 and 2) comes into regulation.

The delay provided by the circuit of FIG. 3b for beginning to turn on transistor Qhs on initial start-up provides for de-bouncing the power supply connections on the backplane so that no significant current is drawn from the backplane until de-bouncing is complete. Of course, in the event the hot swap capability of the circuit is disabled (the voltage on the how swap enable pin HS-EN is held low), transistor Qhs (FIGS. 1 and 2) will be held off by the low voltage on the HS-VG pin and the pulse width modulator will be held in the global shutdown condition by the signal Vout-OK_int being held in the high state. Further, if the input voltage Vin minus the drain voltage of transistor Qhs is, or becomes, less than the under voltage lockout voltage, comparator 54 (FIG. 3*a*) will cause a global shutdown and comparator 90 (FIG. 3*b*) will cause the gate voltage on the HS-VG pin to remain low, holding transistor Qhs (FIGS. 1 and 2) off until the under voltage lockout condition is corrected.

The circuits of FIGS. 3*a* and 3*b* are preferably combined in a single integrated circuit, though as one of many alternatives, the highside and lowside transistors QH and QL may readily be discrete components instead, if desired. However, even though most, if not all, of the circuits of FIGS. 3*a* and 3*b* are realized as a single integrated circuit, it will be noted that the hot swap feature of the present invention may be bypassed, if desired, by connecting the integrated circuit grounds AGND and PGND (FIG. 3*a*) to the lowside of the power supply, rather than to the drain of a transistor Qhs (FIGS. 1 and 2).

An additional feature of the present invention is illustrated in FIG. 3*a*. Specifically, it will be noted that the Q output of RS flip-flop 86 is coupled to the output pin PPWM. In switching converters providing a low voltage regulated output, diodes in the output circuit, such as diodes Do1 and Do2 of FIGS. 1 and 2, provide an undesirably high power dissipation in the output circuit. Accordingly, it is preferable to use synchronous rectifiers in such applications. The signal on the PPWM terminal may be coupled, such as by way of an optical coupler, to a synchronous rectifier driver circuit synchronizing the switching transistors, such as MOS transistors in place of diodes Do1 and Do2. Such a synchronous rectifier driver may be powered, by way of example, by an additional secondary winding on transformer T1, so as to maintain isolation between the input and output circuits in applications where isolation is required. In that regard, since the signal on the PPWM terminal in the exemplary embodiment is taken directly from the Q output of RS flip-flop 86, whereas the switching in the highside and lowside transistors QH and QL is controlled through additional circuitry comprising NOR gate 74, level shift 76 and highside driver 78 and lowside driver 80, the signal on the PPWM terminal may be made to lead the switching of the highside and lowside transistors in an amount substantially equal to the delay in a typical optical coupler and the circuitry in the synchronous rectifier driver to better synchronize the synchronous rectifiers on the secondary of transistor T1 and the highside and lowside switches HS and HL of FIG. 3*a*.

Figure 4:
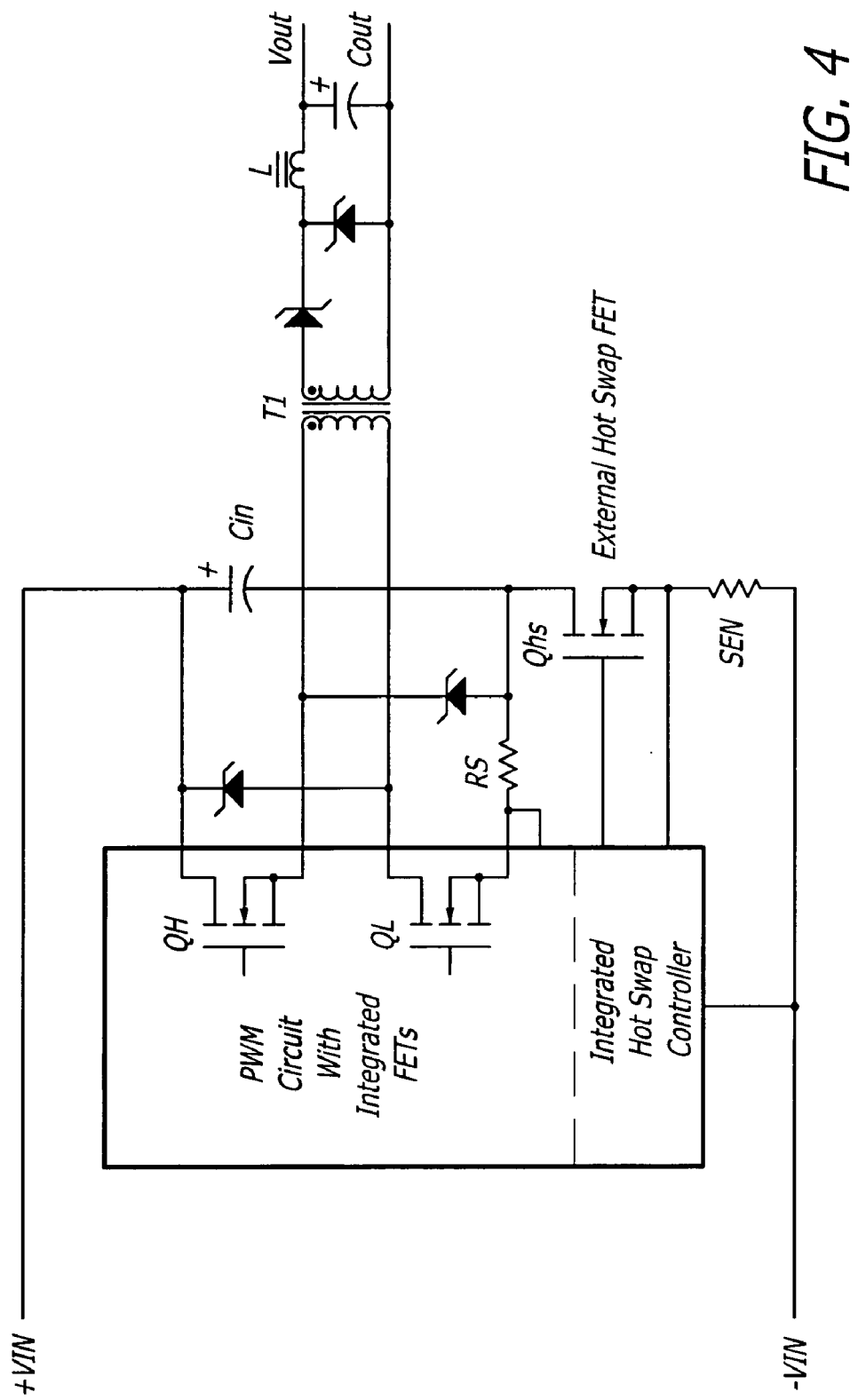
FIG. 4 is a block diagram of another exemplary embodiment of the present invention.

Now referring to FIG. 4, a further exemplary embodiment of the present invention may be seen. This embodiment may be very similar to the embodiment of FIGS. 3*a* and 3*b*, though incorporates a current sense resistor SEN in series with the source of the hot swap transistor QHS. This provides a signal to the hot swap controller that may be used to limit the inrush current during hot swap operation. The ultimate control used in an embodiment of the present invention during hot swapping may thus be by way of limiting the rate of rise of the voltage applied to the pulse width modulator, by limiting the current through the hot swap transistor, or by limiting on current or voltage rise based on which limit is reached first.

The present invention is applicable to isolated switching power supplies, as illustrated herein, as well as non-isolated power supplies. Also the hot swap transistor, bipolar or MOSFET, may be a discrete component or included in the integrated hot swap controller, though the capacitor in series with the hot swap transistor will normally be a discrete component. Further, while the present invention has been described with respect to switching regulators, it is to be understood that switching regulators are simply an example of one type of power integrated circuits with which the present invention is applicable, the present invention being readily adaptable to provide a hot swap capability to a wide range of power integrated circuits.

While the exemplary embodiments have been described with respect to a negative backplane system, the invention is applicable to both positive and negative backplane voltage systems, using circuits substantially as disclosed or alternate circuit designs. In that regard, various features of the invention have been described, though it is not required that all features be practiced in any one embodiment of the invention, as each feature used alone is advantageous in its own right. Also both forward and flyback power topologies are possible. For most applications the power switching frequency will be around 250 KHz. At this frequency, external power passives are small enough for a compact circuit, while switching losses are not excessive. As a further example of alternate embodiments, while the embodiment disclosed herein includes the converter switching transistors QH and QL in integrated circuit form, any switching transistors may be off-chip, as may be more appropriate in circuits for high power applications. In other cases, the external transistor Qhs may be part of the integrated circuit.

The foregoing disclosure of a preferred embodiment of the present invention is for purposes of illustration and explanation and not for purposes of limitation of the invention, as various alternate embodiments will be apparent to those skilled in the art. Thus while a certain exemplary embodiment has been described in detail and shown in the accompanying drawings, it is to be understood that such embodiment is merely illustrative of and not restrictive on the broad invention, and that this invention is not to be limited to the specific arrangements and constructions shown and described, but instead is to be defined by the full scope of the following claims, since various other modifications will occur to those of ordinary skill in the art.

What is claimed is:

1. A hot swappable pulse width modulation switching regulator controller comprising:
   a hot swap transistor having a control terminal;
   a pulse width modulation circuit coupled in series with the hot swap transistor, the pulse width modulation circuit including a pulse width modulation control circuit coupled to at least one switching transistor for switching the switching transistor on and off at a frequency determined by the pulse width modulation control circuit;
   a hot swap circuit coupled to a control terminal of the hot swap transistor;
   the hot swap circuit, when the hot swap circuit and the series combination of the hot swap transistor and the pulse width modulation circuit are coupled to a source of power having a power source voltage, turning on the hot swap transistor by changing a voltage on the control terminal at a controlled rate in spite of the sudden application of power to the hot swappable pulse width modulation switching regulator controller, and maintaining the hot swap transistor on until the hot swappable pulse width modulation switching regulator controller is no longer coupled to a source of power having the power source voltage;
   the pulse width modulation circuit and the hot swap circuit being in a single integrated circuit.

2. The hot swappable pulse width modulation switching regulator controller of claim 1 wherein the controlled rate is provides a predetermined rate of voltage increase across the pulse width modulation control circuit.

3. The hot swappable pulse width modulation switching regulator controller of claim 1 wherein the controlled rate is a rate providing a controlled current through the hot swap transistor.

4. The hot swappable pulse width modulation switching regulator controller of claim 1 wherein the controlled rate is a predetermined rate of voltage increase across the pulse width modulation control circuit, or a rate providing a controlled current through the hot swap transistor, whichever limit occurs first.

5. The hot swappable pulse width modulation switching regulator controller of claim 1 wherein the hot swap transistor is part of the integrated circuit.

6. The hot swappable pulse width modulation switching regulator controller of claim 1 wherein the hot swap transistor is a discrete transistor.

7. The hot swappable pulse width modulation switching regulator controller of claim 1 wherein the pulse width of the pulse width modulation switching regulator controller circuit starts with a minimum pulse width and increases until the output of a pulse width modulation converter coupled thereto is within regulation.

8. The hot swappable pulse width modulation switching regulator controller of claim 7 wherein the pulse width modulation switching regulator controller circuit will start when the voltage applied to the pulse width modulation switching regulator controller circuit approaches the power source voltage.

9. The hot swappable pulse width modulation switching regulator controller of claim 8 wherein the pulse width modulation switching regulator controller circuit will not start until the voltage applied to the pulse width modulation switching regulator controller circuit exceeds a predetermined voltage less than the power source voltage.

10. The hot swappable pulse width modulation switching regulator controller of claim 1 wherein the pulse width modulation switching regulator controller circuit will start when the voltage applied to the pulse width modulation switching regulator controller approaches the voltage of the source of power.

11. The hot swappable pulse width modulation switching regulator controller of claim 10 wherein the pulse width modulation switching regulator controller will not start until the voltage applied to the pulse width modulation switching regulator controller exceeds a predetermined voltage.

12. The hot swappable pulse width modulation switching regulator controller of claim 1 wherein the at least one switching transistor is in the integrated circuit.

13. A hot swappable pulse width modulation converter comprising:
    a hot swap transistor; and,
    an integrated circuit comprising
        a pulse width modulation switching regulator controller coupled in series with the hot swap transistor;
        a hot swap circuit coupled to a control terminal of the hot swap transistor;
        the hot swap circuit, when the hot swap circuit and the series combination of the hot swap transistor and the pulse width modulation switching regulator controller are suddenly coupled to a source of power, turning on the hot swap transistor by charming the voltage on the control terminal at a controlled rate, and maintaining the hot swap transistor on until the hot swap circuit and the series combination of the hot swap transistor and the pulse width modulation switching regulator controller are no longer coupled to a source of power.

14. The hot swappable pulse width modulation converter of claim 13 wherein the controlled rate provides a predetermined rate of voltage increase across the pulse width modulation switching regulator controller.

15. The hot swappable pulse width modulation converter of claim 13 wherein the controlled rate is a rate providing a controlled current through the hot swap transistor.

16. The hot swappable pulse width modulation converter of claim 13 wherein the controlled rate is a predetermined rate of voltage increase across the pulse width modulation control circuit, or a rate providing a controlled current through the hot swap transistor, whichever limit occurs first.

17. The hot swappable pulse width modulation converter of claim 13 wherein the hot swap transistor is part of the integrated circuit.

18. The hot swappable pulse width modulation converter of claim 13 wherein the hot swap transistor is a discrete transistor.

19. The hot swappable pulse width modulation converter of claim 13 wherein the pulse width of the pulse width modulation switching regulator controller starts with a minimum pulse width and increases until the output of the pulse width modulation converter is within regulation.

20. The hot swappable pulse width modulation converter of claim 19 wherein the pulse width modulation switching regulator controller will start when the voltage across the hot swap transistor falls below a predetermined voltage.

21. The hot swappable pulse width modulation converter of claim 20 wherein the pulse width modulation switching regulator controller will not start until the voltage applied to the pulse width modulation switching regulator controller exceeds a predetermined voltage.

22. The hot swappable pulse width modulation converter of claim 13 wherein the pulse width modulation switching regulator controller will start when the voltage across the hot swap transistor falls below a predetermined voltage.

23. The hot swappable pulse width modulation converter of claim 22 wherein the pulse width modulation switching regulator controller will not start until the voltage applied to the pulse width modulation switching regulator controller exceeds a predetermined voltage.

24. The hot swappable pulse width modulation converter of claim 13 comprises a single integrated circuit plus the hot swap transistor as a discrete transistor.

\* \* \* \* \*